United States Patent
Nagai et al.

[11] Patent Number: 6,104,388
[45] Date of Patent: Aug. 15, 2000

[54] HANDWRITING INPUT DEVICE

[75] Inventors: Katsuharu Nagai, Nara; Hideyuki Hiro, Tenri, both of Japan

[73] Assignee: Sharp Kabushiki Kaisha, Osaka, Japan

[21] Appl. No.: 09/104,243

[22] Filed: Jun. 25, 1998

[30] Foreign Application Priority Data

Jul. 18, 1997 [JP] Japan .................................. 9-193696

[51] Int. Cl.⁷ .................................................. G09G 5/00
[52] U.S. Cl. ..................... 345/179; 345/173; 178/18.01; 178/19.04
[58] Field of Search .................... 345/173, 179; 178/18.01, 18.02, 18.03, 19.04, 19.01, 19.03, 87

[56] References Cited

U.S. PATENT DOCUMENTS

| | | | |
|---|---|---|---|
| 4,109,146 | 5/1992 | Hillman | 350/96.1 |
| 4,667,182 | 5/1987 | Murphy | 178/18 |
| 5,111,004 | 5/1992 | Gullman | 178/18 |
| 5,434,371 | 7/1995 | Brooks | 178/18 |
| 5,461,204 | 10/1995 | Makinwa et al. | 178/19 |
| 5,571,997 | 11/1996 | Gray et al. | 178/18 |

FOREIGN PATENT DOCUMENTS

| | | |
|---|---|---|
| 9-16320 | 1/1997 | Japan . |
| 9-16321 | 1/1997 | Japan . |
| 9-16322 | 1/1997 | Japan . |

*Primary Examiner*—Richard A. Hjerpe
*Assistant Examiner*—Kimnhung Nguyen
*Attorney, Agent, or Firm*—Nixon & Vanderhye, P.C.

[57] ABSTRACT

A handwriting input device, despite having a simple structure, achieves correct acquisition of handwritten information. This input device has a pen stem housed inside a pen body formed in the shape of a pen, with the tip of the pen stem left sticking out of an opening formed at one end. This input device further has a pen stem holder having a hemispherical projection formed in its middle portion, an omnidirectional pressure sensor having an actuator and an operation shaft formed integrally, a data processor for processing electric signals outputted from the sensor, and a connector for connecting the tail-end cap portion of the pen stem holder to the operation shaft of the sensor. Thus, this input device detects the force applied to the tip of the pen stem by sensing pressure; in addition, it also detects the up/down movement of the pen stem by sensing pressure.

20 Claims, 6 Drawing Sheets

HANDWRITING INPUT DEVICE

BACKGROUND OF THE INVENTION

1. Field of the Invention

The present invention relates to a pen-type handwriting input device for detecting and recognizing handwritten information such as handwritten characters and symbols or for feeding such handwritten information to a computer or the like.

2. Description of the Prior Art

As input devices for feeding information to a computer, keyboards, mice, and data tablets are already in wide use. To realize pen-type input devices that do not require a tablet and thus afford higher portability, various proposals have been made to date. For example, according to some proposals, an input device detects its own movement during writing by means of an acceleration sensor provided inside the device and thereby feeds handwritten information to a computer for processing (Japanese Laid-Open-Patent Applications Nos. H4-195321, H4-256009, H7-110737, H8-076914, etc.); according to other proposals, an input device detects the pressure applied to a pen by the individual fingers of the user during writing (Japanese Laid-Open Patent Application No. H6-095800, etc.); according to still other proposals, an input device reads handwriting optically by means of an optical sensor (Japanese Laid-Open Patent Application No. H5-278390, etc.).

However, in a pen-type handwriting input device that is sufficiently portable and at the same time capable of detecting and recognizing handwritten information such as handwritten characters and symbols as written in reality or capable of feeding such handwritten information to a computer or the like, the movement of the pen itself during ordinary writing is too subtle to be fed effectively to an acceleration sensor as mentioned above. Of course, it is possible to electrically boost the acceleration signal, but such boosting ends in boosting noise as well, and thus does not make any easier the extraction of necessary signal components.

In particular, the detection of static acceleration is often simply impossible with some types of small-size acceleration sensors. The use of an acceleration sensor makes it necessary to align the x and y axes of the acceleration sensor precisely with respect to the direction of the stem of the pen as it is when the pen is held in writing position, and also to detect the up/down and other movement of the pen. This requires the use of a plurality of additional sensors and switches apart from the acceleration sensor itself, and thus inevitably makes the system and device as a whole unduly large.

To overcome this inconvenience, a proposal has been made according to which, in combination with an acceleration sensor, a capacitance-type pressure sensor is used that is fitted directly to a stick serving as the above-mentioned stem of the pen (Japanese Laid-Open Patent Applications Nos. H9-16320, H9-16321, H9-16322, etc.). However, according to this proposal, the detection of subtle movement of the tip of the pen is possible only by the use of a large-scale boosting circuit, and such detection, even if possible, is difficult to conduct especially when considerably strong pressure is applied to the pen.

Moreover, this structure suffers from susceptibility to noise, from large deviations that appear in the sensor output depending on the direction in which the pen is held during writing, and from great difficulty in returning the stem of the pen and the sensor to their origins and in correcting the zero-point output when the pen is not in use for writing, that is, when the tip of the pen is receiving no load.

On the other hand, an input device of the type that detects the pressure of the fingers suffers from noise greater than the actually needed signal components carrying handwritten information and requires extra detection of the up/down movement of the pen. An input device of the type that reads handwriting optically by means of an optical sensor needs to be capable of processing image data and thus cannot be realized without making the system and device as a whole unduly large.

SUMMARY OF THE INVENTION

An object of the present invention is to provide a handwriting input device that, despite having a simple structure, achieves correct acquisition of handwritten information.

To achieve the above object, according to the present invention, a handwriting input device having a pen body in the shape of a pen is provided with, inside the pen body, a pen stem holder for holding a pen stem in such a way that a part of the pen stem sticks out of the pen stem holder through an opening provided at one end of the pen stem holder, the pen stem in holder having a hemispherical projection formed in its middle portion; an omnidirectional pressure sensor having an operation shaft formed integrally with an actuator; a data processor for processing electric signals outputted from said sensor; and a connector for connecting the tail cap portion of the pen stem holder to the operation shaft of the sensor.

According to the present invention, the hemispherical projection formed in the middle portion of the pen stem holder, in combination with a supporter provided inside the pen body, forms a fulcrum that allows the pen stem to rotate about the center of the hemispherical projection. The omnidirectional pressure sensor provided inside the pen body has a pressure-sensing plate placed perpendicularly to the axis of the pen stem. The connector for connecting the pen stem holder to the operation shaft formed integrally with the actuator placed at the center of the pressure-sensing plate of the omnidirectional pressure sensor is made of a resilient material.

Moreover, the pen stein holder has a holding pipe in the shape of a hollow pipe having a smaller diameter in its tail-cap portion, and the pen stem is removably held inside this pipe.

In the method of detecting handwriting and handwritten information according to the present invention, the omnidirectional pressure sensor detects the variation of the pressure applied thereto and thereby obtains information as to the variation with time of the direction and magnitude of the force due chiefly to friction that the tip of the pen stem receives directly from the surface of paper on which writing is performed. Moreover, the direction in which the pen stem is held and the up/down movement of the pen stem are detected simultaneously.

The data processor is provided with a device for subjecting the electric signals outputted from the sensor to amplification and A/D conversion, a dictionary unit for storing data of characters, numbers, symbols, and others, and an analyzer unit for analyzing the electric signals for character recognition, calculation, and other operations. Inside the pen body is provided an interface unit for displaying calculation results and other data from the analyzer unit on a display, or for exchanging data with an external computer system or a similar device.

Information as to the variation with time of the direction and magnitude of the force due chiefly to friction that the tip of the pen receives directly from the surface of paper during writing is obtained by sensing the variation in the pressure applied to the pressure sensor. This enables the pressure sensor to output zero when the pen is held off the paper, that is, when the pen is receiving no load. As a result, it is possible to simultaneously detect the up/down movement of the pen. In addition, since the direction in which the pen is held is recognized by the outputs obtained when the tip of the pen is put on the paper for the first time, it is possible to align the x and y axes of the sensor precisely with respect to the direction in which the pen is held when it is in writing position.

Moreover, a fulcrum is formed in the pen stem so that the pen stem is prevented from moving toward its tail-end cap side and the pen stem is rotatable about this fulcrum. As a result, information as to the variation with time of the direction and magnitude of the force due chiefly to friction that the tip of the pen stem receives directly from the surface of paper on which writing is performed can be transmitted to the pressure sensor with higher sensitivity, because it is possible to subject such information to mechanical amplification based on the principles of the lever, and also because it is possible to absorb the component of the pressure that acts along the axis of the pen stein even when considerably strong pressure is applied to the pen stem.

Furthermore, the pen stem holder and the operation shaft placed at the center of the pressure-sensing plate of the omnidirectional pressure sensor that is disposed with its pressure-sensing plate perpendicular to the axis of the pen is connected with a resilient connector. This alleviates the deviations appearing in the sensor outputs depending on the direction in which the pen is held, and also facilitates the origin return of the pen stem and the sensor as well as the zero-point output correction when the pen is not used, that is, when the tip of the pen is receiving no load.

The handwritten information detected in this way is first processed by the data processor, and is then transmitted by the interface unit to an external computer system or the like. In this case, the handwriting input device can be used as a system-oriented input device. When the handwriting input device is provided with a display, it can be used independently as an input device that can handle both data input and display output.

The pen stein is removable, and therefore can be replaced with another one as desired. For example, when a stem similar to an ordinary ball-point-pen refill is used as the pen stem, the handwriting input device can be used as an input device that can leave the traces of handwriting on paper or the like, and, when a stem in having no ink is used as the pen stem, the handwriting input device can be used as an ordinary mouse.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
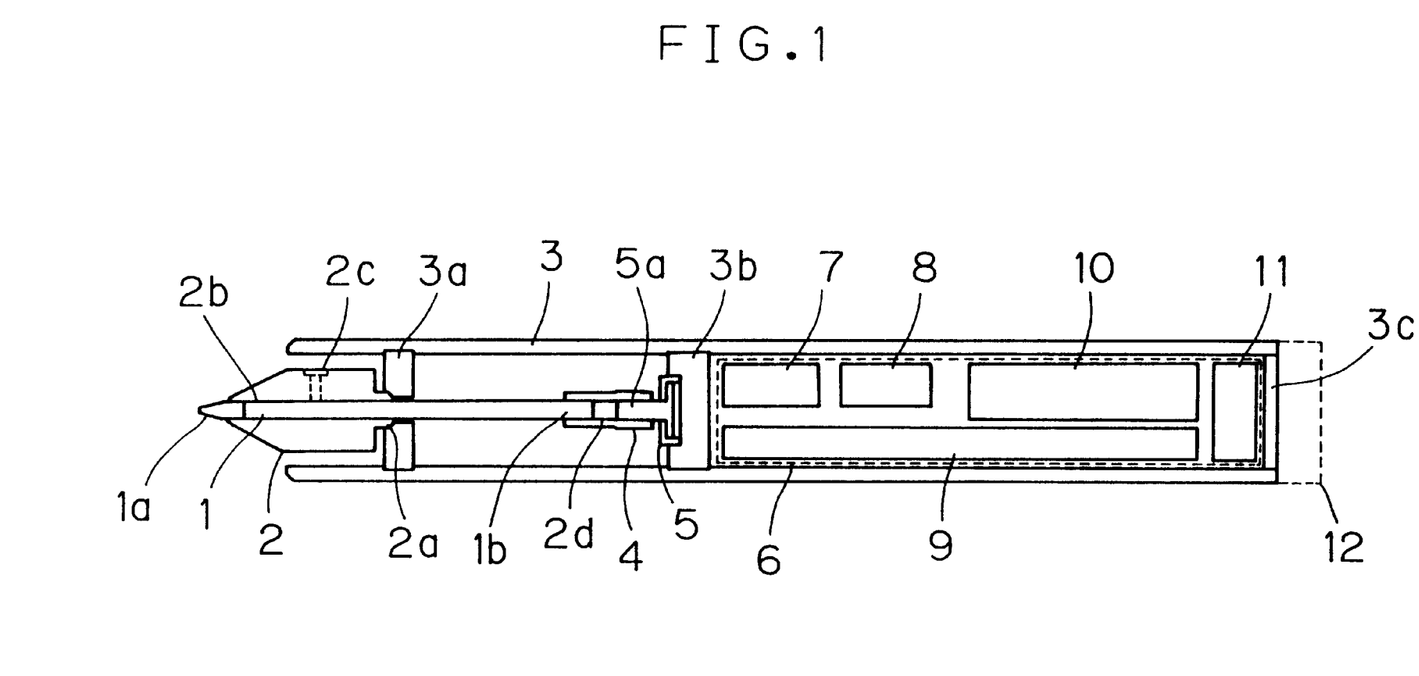
FIG. 1 is a diagram showing the overall structure of a first embodiment of the invention.
Figure 2:
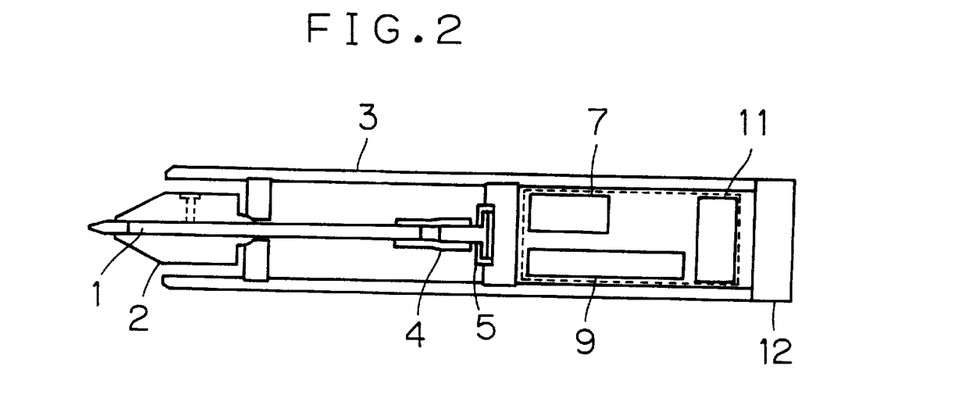
FIG. 2 is a diagram showing the overall structure of a second embodiment of the invention.
Figure 3:
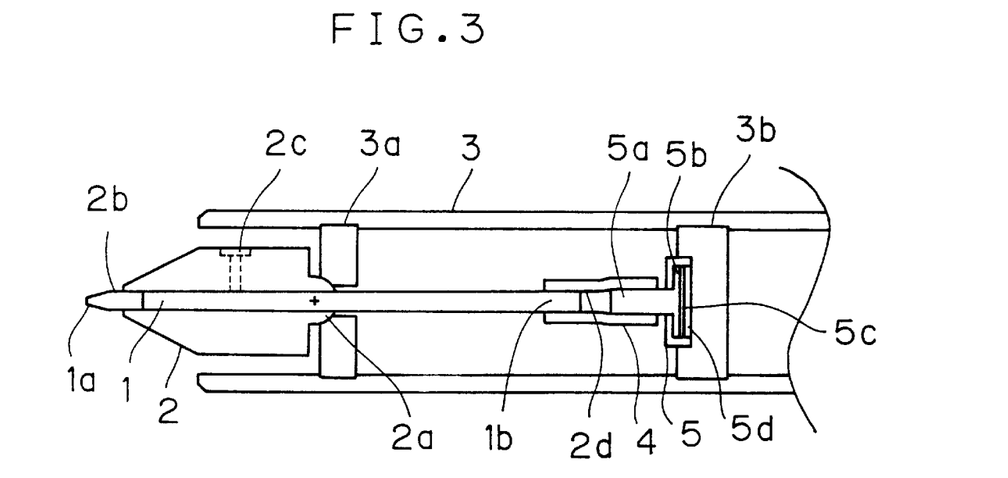
FIG. 3 is a diagram showing an example of the structure of the handwriting detecting portion of the embodiments.

FIGS. 1 and 2 show, in the form of longitudinal sectional views, the overall structure of the handwriting input devices of a first and a second embodiment, respectively, of the present invention. FIG. 3 shows, in the form of an enlarged longitudinal sectional view, the structure of the handwriting detecting portion of these embodiments.

A pen stem holder 2 consists of a nozzle having a hemispherical projection 2a, and a holding pipe 2b fixed thereto with a screw serving as a holding pipe fixer 2c or joined thereto with adhesive. The holding pipe 2b is a hollow pipe through which a pen stem 1 is placed, and is so formed as to have a smaller inner diameter in its tail-end cap portion 2d (serving as the tail-end cap portion of the holder) than in its other portion. Thus, at one end, the pen stem 1 is so held that it does not move further inward. At the other end, the pen stein 1 is left sticking out of the pen stem holder 2 through an opening formed through the pen stem holder 2. This permits the pen stein 1 to be removed and inserted by pulling and pushing its tip 1a, and thus the pen stem 1 can be replaced with a new one when ink runs out.

Since the pen stem 1 is removable, when a stem similar to an ordinary ball-point-pen refill is used as the pen stem 1, the handwriting input device can leave the traces of handwriting on paper or the like, and, when a stem having no ink is used as the pen stem 1, the handwriting input device can be used as an ordinary mouse.

The hemispherical projection 2a of the pen stem holder 2 is supported by a pen stem holder supporter 3a that is provided inside a pen body 3 and that has a dent formed in a hemispherical shape that fits the shape of the projection 2a. Thus, the pen stem holder 2 is so held that it does not move toward the tail-end cap side of the pen stem 1 but it can rotate about the center of these hemispheres.

Since the pen stem holder 2 is supported in this manner, information as to the variation with time of the direction and magnitude of the force, due chiefly to friction, that the tip 1a of the pen stem 1 receives directly from the surface of paper on which writing is performed can be transmitted to a pressure sensor 5 after mechanical amplification based on the principles of the lever and thus with higher sensitivity.

Moreover, since the pen stem holder 2 is supported in the above described manner, it is possible, even when considerably strong pressure is applied to the pen stem 1, to absorb the component of the pressure that acts along the axis of the pen stem 1.

The pen stem holder 2 is connected, by a connecting tube 4 made of a resilient material such as silicone rubber, to an operation shaft 5a that is formed integrally with an actuator 5b placed at the center of a pressure-sensing plate 5c of the omnidirectional pressure sensor 5. The omnidirectional pressure sensor 5 is fixed, with adhesive or by some other means, on a sensor supporter 3b provided inside the pen body 3. The sensor 5 senses pressure by means of the pressure-sensing plate 5c that is placed perpendicularly to the axis of the pen stem 1 with its center on this axis. This helps to alleviate the deviations that appear in the output of the sensor 5 depending on the direction in which the pen stem 1 is held, and also helps to facilitate the origin return of the pen stem 1 and the sensor 5 as well as the zero-point output correction that are to be performed when the pen stem 1 is not in use, that is, when it is receiving no load.

Figure 4:
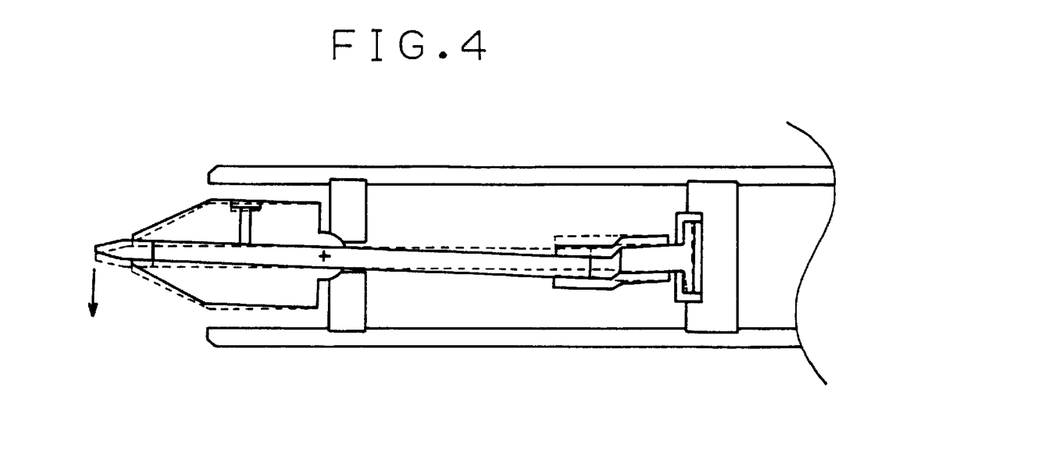
FIG. 4 is a diagram showing an example of how the handwriting detecting portion works.

FIG. 4, in combination with FIG. 3, schematically shows how the above-described portion works during writing. It should be understood that, in this figure, the movement of the pen stem 1 is illustrated with exaggeration so as to be easily visible, although, in reality, the pen stem 1 does not move so much to detect the force, due chiefly to friction, that it receives at its tip 1a during writing. When writing is performed in the direction indicated by the arrow, the tip 1a receives force due to friction that acts in the opposite direction. This causes the pen stem 1, and also the sensor operation shaft 5a connected thereto by the connecting tube 4, to move as shown in the figure, with the result that the sensor 5 receives pressure in its portion on the lower side (in the direction of the arrow) of the center of the operation shaft in the figure.

Figure 5A:
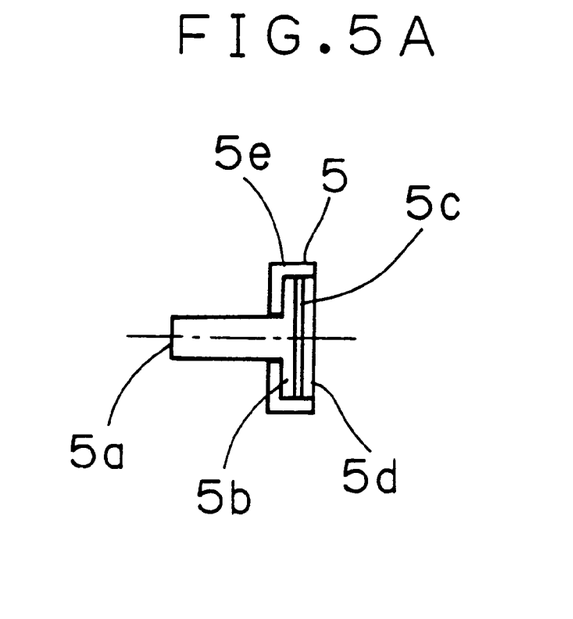
FIGS. 5A and 5B are diagrams showing the structure of the pressure sensor used in the embodiments and the division of the pressure-sensing area thereof.
Figure 5B:
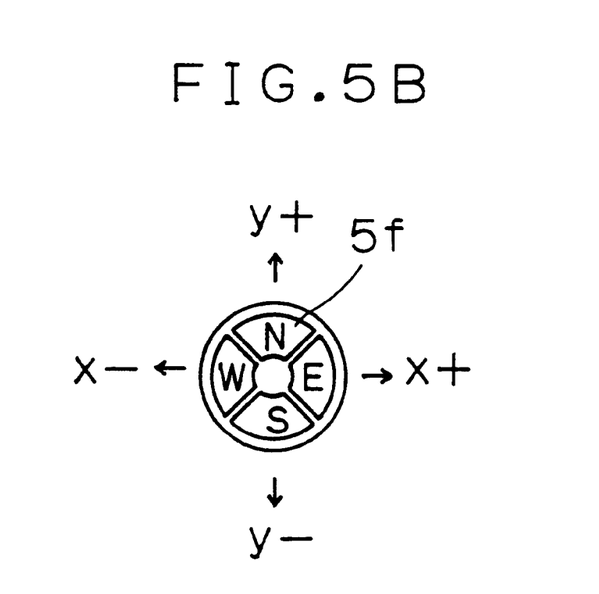
Figure 6A:
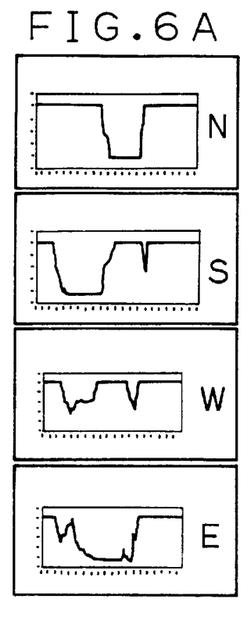
FIGS. 6A to 6F are diagrams showing examples of the outputs, during the writing of numbers, of the processor that performs A/D conversion.
Figure 6B:
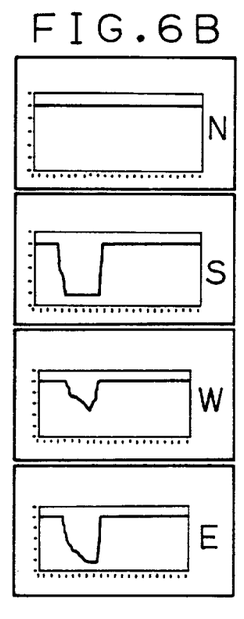
Figure 6C:
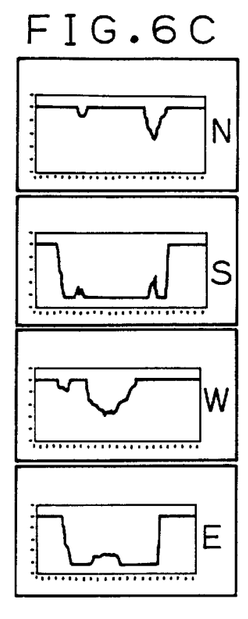
Figure 6D:
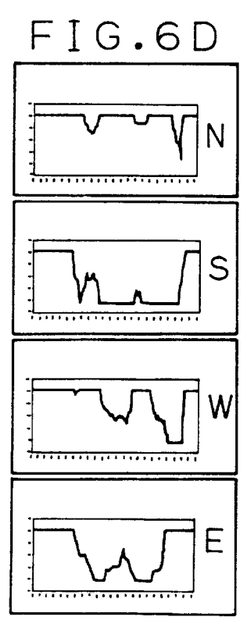
Figure 6E:
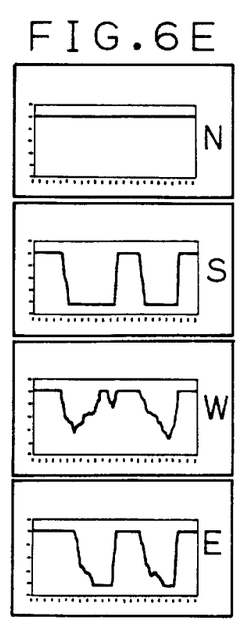
Figure 6F:
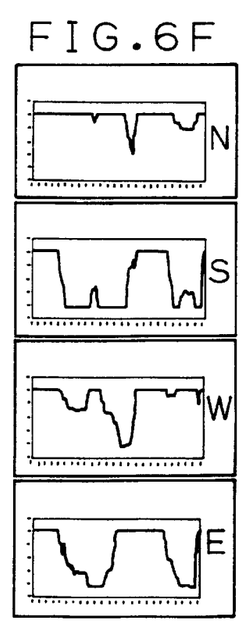

FIGS. 5A and 5B show the structure of the omnidirectional pressure sensor 5 and the division of the pressure-sensing area thereof. The sensor 5 is a pointing device that is already commonly used as a cursor position control device for personal computers, and these figures show an example of the structure of such a device. The sensor 5 has a pressure-sensing plate 5c, composed of a pressure-sensing resistive element that is either resilient itself or joined to a resilient material, between a movable disk-shaped actuator 5b that can be inclined with respect to the axis of the operation shaft 5a and a fixed print circuit board 5d. The actuator 5b, the pressure-sensing plate 5c, and the printed circuit board 5d are enclosed in a case 5e.

The omnidirectional pressure sensor 5 determines the magnitude of pressure by exploiting the property of a certain resistive material that changes its resistance with the pressure it receives. It also determines the direction (represented as an angle within 360°) in which the pressure is acting by sensing the pressure separately in four directions (x+, x−, y+, and y− directions).

In FIG. 5B, the divided regions (indicated by symbols E, W, N, and S) of the pressure-sensing area 5f correspond to the four directions (x+, x−, y+, and y− directions). Thus, by sensing the pressure separately in different directions, it is possible to determine the direction (represented as an angle within 360°) in which the pressure is acting. In addition, since the pressure-sensing plate 5c is composed of a pressure-sensing resistive element that converts a change in the pressure it receives to a change in its resistance, it is also possible to obtain an electric signal whose voltage varies with the magnitude of the pressure.

FIGS. 6A to 6F show examples of the outputs from the sensor 5 during actual writing of numbers as observed after amplification and A/D conversion by a processor 7. FIGS. 6A to 6F show examples of the sensor outputs during the writing of numbers "0", "1", "2", "3", "4", and "5", respectively.

The ordinate on each graph represents the value obtained by subjecting the voltage output from a sensor to A/D conversion with respect to a reference value (representing the output in the no-load state); the higher the output voltage, the smaller the obtained value. The abscissa on each graph represents time. The outputs thus obtained for four directions may be synthesized into two signals that represent the sensor outputs simply in two, i.e. x and y, directions.

Figure 7:
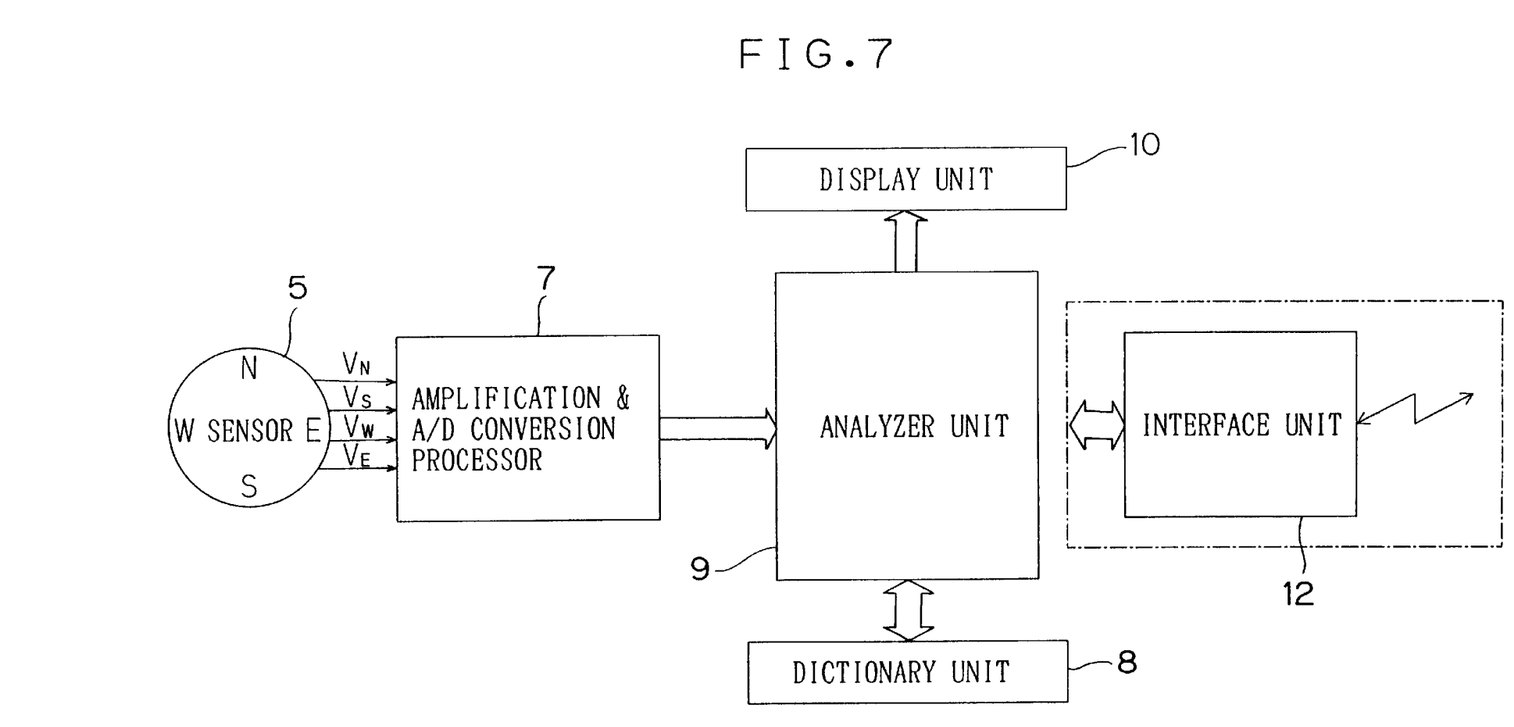
FIG. 7 is a block diagram showing the structure of the first embodiment.
Figure 8:
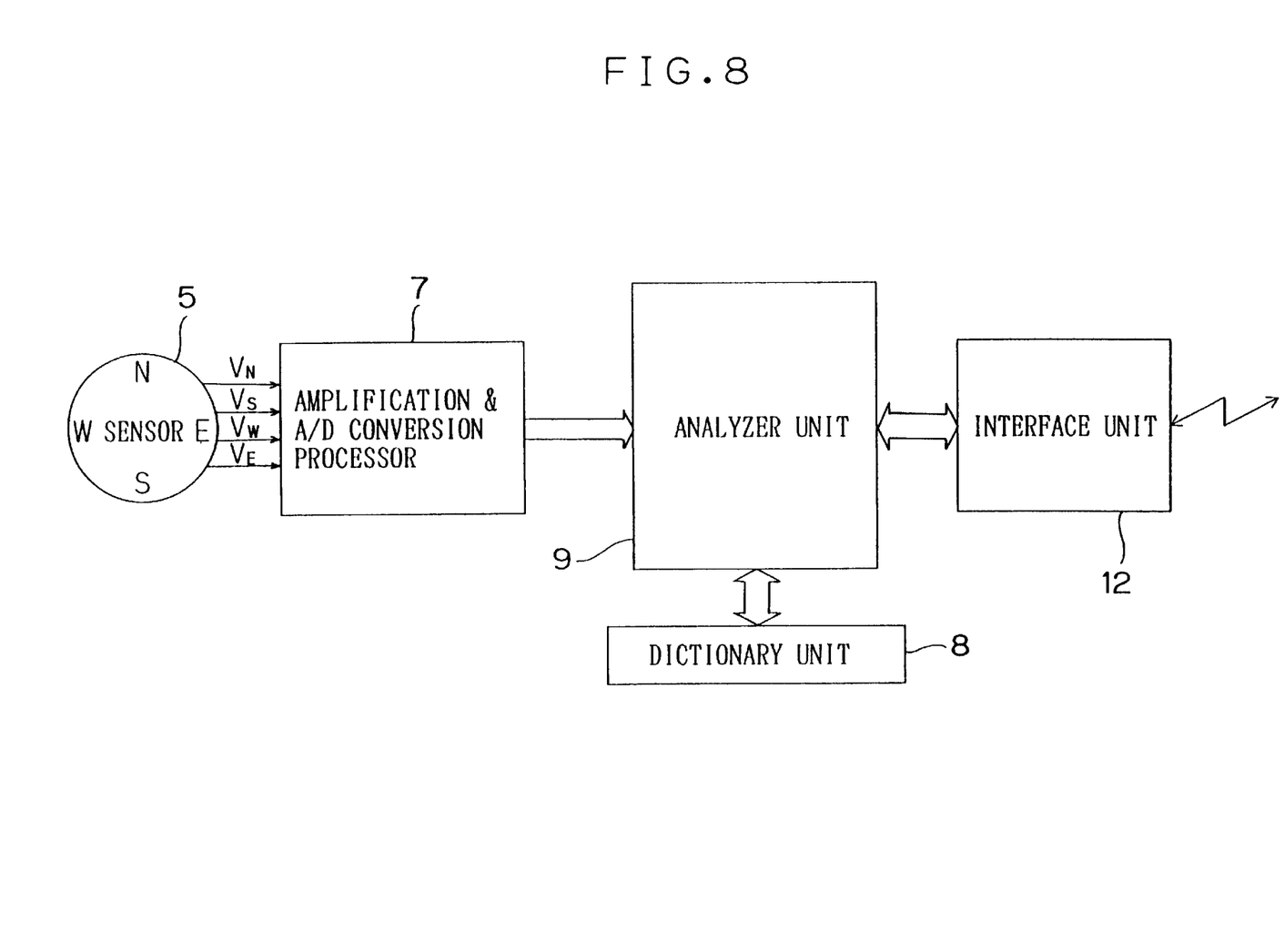
FIG. 8 is a block diagram showing the structure of the second embodiment.

A data processor 6 has a processor 7 that performs amplification and A/D conversion on the electric signals outputted from the sensor, a dictionary unit 8 in which data is stored of characters, numbers, symbols, and the like, and an analyzer unit 9 that analyzes the electric signals for character recognition, calculation, and other operations.

The amplification and A/D conversion processor 7 receives the voltage outputs $V_N$, $V_S$, $V_W$, and $V_E$ from the sensor 5, amplifies them by means of an amplifier, converts them into digital data at regular intervals by means of an A/D converter and by using the no-load outputs as reference voltages, and then outputs the digital data to the analyzer unit 9.

The analyzer unit 9 further processes the digital data it receives from the amplification and A/D conversion processor 7, compares those data with the data of characters and others previously stored in the dictionary unit 8 and thereby performs character recognition, and, if the recognized characters are numbers and operators, performs calculation. The results of the character recognition and calculation are fed to a display unit 10, or to an interface unit 12.

The input device, shown in FIG. 1, of the first embodiment of the present invention incorporates the display unit 10 for displaying calculation results and other data fed from the analyzer unit 9, and therefore it can be used independently to achieve both data input and display output. When this device is used solely for display output within the device, the element 3c shown in the figure serves simply as a tail-end cap of the pen body, or as a removable lid that is removed for the replacement of a battery 11 (power supply unit). The device may be additionally provided with an interface unit 12 for exchanging data, such as the calculation results or other data from the analyzer unit 9, with an external computer system or the like.

The input device, shown in FIG. 2, of the second embodiment of the present invention is an example of a system-oriented input device provided with such an interface unit 12 for exchanging data with an external computer system or the like.

In both embodiments, the interface unit 12 may conduct communication through wires, or wirelessly such as by infrared light or by radio.

Moreover, in both embodiments, it is possible to provide the dictionary unit 8 (in which data is stored of characters, numbers, symbols, and others) and part or the whole of the analyzer unit 9 (which analyzes the sensor outputs for character recognition, calculation, and other operations) within the external computer system or the like so that data processing is achieved through the communication between the pen proper and the computer system by way of the above-mentioned interface 12.

FIGS. 7 and 8 are block diagrams showing the structures of the first and second embodiments, respectively. The portion enclosed by the dash-and-dot lines is present only when the input device is provided with the interface 12 for exchanging the calculation results from the analyzer unit 9 and other data with an external computer system and the like.

As described above, according to the present invention, it is possible, by the use of only one pressure sensor and regardless of the magnitude of the pressure applied to a pen by the user, to obtain, with high sensitivity, information as to the variation with time of the direction and magnitude of the force, due chiefly to friction, that the tip of the pen receives directly from the surface of paper on which writing is performed. Moreover, it is also possible to detect, simultaneously, the up/down movement of the pen. Furthermore, it is possible to align the x and y axes of the sensor precisely with respect to the direction of the stem of the pen as it is when the pen is held in writing position. Thus, it is possible to realize a pen-type input device that is inexpensive, is compact, and has a simple structure.

Moreover, by providing the input device with a data processor that includes a display unit for displaying calculation results and other data fed from an analyzer unit, it is possible to realize an input device that can be used independently for both data input and display output, and, by providing the input device with an interface unit, it is possible to realize a system-oriented input device that can exchange data with an external computer system or the like.

Furthermore, since the pen stem is removable, when a stem similar to an ordinary ball-point-pen refill is used as the pen stein, the input device can be used as a handwriting input device that can leave the traces of handwriting on paper or the like, and the pen stem can be replaced with a new one when ink runs out; when a stem having no ink is used as the pen stein, the input device can be used as an ordinary mouse.

Obviously, many modifications and variations of the present invention are possible in light of the above teachings. It is therefore to be understood that within the scope of the appended claims, the invention may be practiced other than as specifically described.

What is claimed is:

1. A handwriting input device having a pen body in a shape of a pen, said handwriting input device including, inside said pen body:
   a pen stem holder for holding a pen stem in such a way that a part of said pen stem sticks out of said pen stem holder through an opening provided at one end of said pen stem holder, said pen stem holder having a hemispherical projection formed in its middle portion;
   an omnidirectional pressure sensor having an operation shaft formed integrally with an actuator;
   a data processor for processing electric signals outputted from said sensor; and
   a connector for connecting a tail cap portion of said pen stem holder to said operation shaft of said sensor.

2. A handwriting input device as claimed in claim 1, wherein said hemispherical projection formed in the middle portion of said pen stem holder, in combination with a supporter provided inside said pen body, forms a fulcrum that allows said pen stem to rotate about the center of said hemispherical projection.

3. A handwriting input device as claimed in claim 1, wherein said omnidirectional pressure sensor detects direction of pressure by sensing the pressure separately in X-axis and Y-axis directions and representing the detected direction as an angle within 360 degrees, and detects magnitude of the pressure by means of a pressure-sensing plate including a pressure-sensing resistive element whose resistance varies with the pressure it receives.

4. A handwriting input device as claimed in claim 1, wherein said omnidirectional pressure sensor is placed with its center on a center axis of said pen stem and perpendicularly to said center axis.

5. A handwriting input device as claimed in claim 1, wherein said connector is made of a resilient material.

6. A handwriting input device as claimed in claim 1, wherein said omnidirectional pressure sensor detects variation of pressure applied thereto and thereby obtains information as to variation with time of direction and magnitude of force due chiefly to friction that a tip of said pen stem receives directly from a surface of paper on which writing is performed.

7. A handwriting input device as claimed in claim 1, wherein, to achieve detection of handwritten information, direction in which said pen stem is held and up/down movement of said pen stem are detected simultaneously.

8. A handwriting input device as claimed in claim 1, wherein said pen stem holder has a holding pipe in a shape of a hollow pipe having a smaller diameter in its tail-cap portion and said pen stem is removably held inside said pipe.

9. A handwriting input device as claimed in claim 1, wherein said data processor comprises:
   a device for subjecting electric signals outputted from said sensor to amplification and A/D conversion;
   a dictionary unit for storing data of characters, numbers, symbols, and others;
   an analyzer unit for analyzing the electric signals for character recognition, calculation, and other operations; and
   an interface unit for exchanging calculation results and other data from said analyzer unit with an external computer system or a similar device.

10. A handwriting input device comprising;
    a pen body in a shape of a pipe having an opening at one end;
    a pen stem holder, placed inside said pen body with its front end directed to said opening and its rear end directed inward, for holding a pen stem;
    a holder supporter, provided inside said pen body, for holding said pen stem holder in such a way that said pen stem holder is inclinable between its front and rear ends, for preventing said pen stem holder from moving toward its rear end, and for making a tip of the pen stem held in said pen stem holder stick out of said opening;
    a pressure sensor, provided inside said pen body with its pressure-sensing surface approximately perpendicular to an axis of said pen body, for sensing pressure separately in different regions on the pressure-sensing surface;
    an actuator provided between said pen stein holder and said pressure sensor and placed in contact with substantially the entire pressure-sensing surface of said pressure sensor;
    an actuator supporter for supporting said actuator in such a way that said actuator is inclinable with respect to the pressure-sensing surface of said pressure sensor;
    a connector, having resilience, for connecting the rear end of said pen stem holder to said actuator; and
    an information generator for generating, in accordance with an output signal of said pressure sensor, information as to force applied to the tip of the pen stem held by said pen stem holder.

11. A handwriting input device as claimed in claim 10, wherein said pen stem holder has, between its front and rear ends, a projection having a spherical surface, and wherein said holder supporter has a receptacle for seating the projection of said pen stem holder so that said pen stem holder is inclinably supported on this receptacle.

12. A handwriting input device as claimed in claim 11, wherein said pen stem holder is, in its portion between the projection and the rear end, formed in a shape of a bar of a smaller diameter than the projection, and wherein said holder supporter has an orifice through which the rear-end portion of said pen stem holder is loosely inserted so that the projection of said pen stem holder is seated on a rim of this orifice.

13. A handwriting input device as claimed in claim 10, wherein said pressure sensor senses pressure in four regions created by equally dividing the pressure-sensing surface by two lines that pass through the center of the pressure-sensing surface.

14. A handwriting input device as claimed in claim 10, wherein said pressure sensor employs a pressure-sensing resistive element whose electrical resistance varies with pressure applied thereto.

15. A handwriting input device as claimed in claim 10, wherein said pen stem holder is, in its rear-end side portion, formed in a shape of a bar, wherein said actuator has a plate-like portion that is placed in contact with said pressure sensor and a projection-like portion that protrudes approximately perpendicularly from said plate-like portion, and wherein said connector is a resilient tube made of resin, with the rear-end portion of said pen stem holder inserted into one end of said connector and the projection-like portion of said actuator inserted into the other end of said connector.

16. A handwriting input device as claimed in claim 10, wherein said information generator detects direction and magnitude of force applied to the tip of the pen stem held by said pen stem holder by sensing pressure, as represented by output signals of said pressure sensor, that is applied to each of the regions created on the pressure-sensing surface, and said information generator thereby generates information as to the direction and magnitude of the detected force.

17. A handwriting input device as claimed in claim 16, wherein said information generator, based on levels of the output signals of said pressure sensor, judges whether the tip of the pen stem held by said pen stem holder is in contact with something or not, and said information generator thereby generates information as to whether the tip of the pen stem is in contact with something or not.

18. A handwriting input device as claimed in claim 16, wherein said information generator, based on levels of the output signals of said pressure sensor, judges whether the tip of the pen stem held by said pen stem holder is in contact with something or not, and said information generator thereby detects the direction of the force applied to the tip of the pen stem with respect to direction in which the pen stem is held when the tip of the pen stem is in contact with nothing.

19. A handwriting input device as claimed in claim 16, wherein said information generator has, stored therein, data as to how symbols can be recognized from direction and magnitude of force exerted when they are written, and said information generator, based on the direction and magnitude of the detected force, identifies symbols written by use of said handwriting input device and generates information representing the identified symbols.

20. A handwriting input device as claimed in claim 10, further comprising at least one of:

a display for displaying the information generated by said information generator, or a transmitter for transmitting the information generated by said information generator to an external device.

* * * * *